(12) United States Patent  
Schmidt

(10) Patent No.: US 12,344,411 B1  
(45) Date of Patent: Jul. 1, 2025

(54) FOLDABLE LAUNCH AND LANDING PAD FOR DRONES

(71) Applicant: Hoodman Corporation, Torrance, CA (US)

(72) Inventor: Lou Schmidt, Torrance, CA (US)

(73) Assignee: Hoodman Corporation, Torrance, CA (US)

( * ) Notice: Subject to any disclaimer, the term of this patent is extended or adjusted under 35 U.S.C. 154(b) by 0 days.

(21) Appl. No.: 18/626,224

(22) Filed: Apr. 3, 2024

(51) Int. Cl.  
*B64U 70/92* (2023.01)  
*B64U 10/13* (2023.01)

(52) U.S. Cl.  
CPC .............. *B64U 70/92* (2023.01); *B64U 10/13* (2023.01)

(58) Field of Classification Search  
CPC ................................ B64U 70/92; B64U 10/13  
See application file for complete search history.

(56) References Cited

U.S. PATENT DOCUMENTS

| | | | | |
|---|---|---|---|---|
| 5,116,273 | A * | 5/1992 | Chan | A45B 23/00 160/370.21 |
| 6,073,283 | A * | 6/2000 | Zheng | A47G 9/062 5/502 |
| 7,082,883 | B1 * | 8/2006 | Arias | A47C 31/11 108/90 |
| 10,434,885 | B2 * | 10/2019 | Antonini | B64C 25/52 |
| 10,467,685 | B1 * | 11/2019 | Brisson | B64F 1/222 |
| 10,577,126 | B2 * | 3/2020 | Mozer | B64F 1/02 |
| 11,235,891 | B2 * | 2/2022 | Schmidt | B64F 1/00 |
| 11,459,117 | B1 * | 10/2022 | Shapiro | G08G 5/54 |
| 11,597,515 | B2 * | 3/2023 | Passley | B64F 1/007 |
| 11,636,771 | B2 * | 4/2023 | Barker | B64U 50/39 701/16 |
| 11,667,402 | B2 * | 6/2023 | Liske | B64U 50/37 244/116 |
| 11,673,690 | B2 * | 6/2023 | Dayan | B64U 80/70 244/114 R |
| 11,748,688 | B2 * | 9/2023 | Ur | B64C 39/024 705/332 |
| 11,767,129 | B2 * | 9/2023 | Warwick | B64C 39/024 244/137.1 |
| 11,772,819 | B2 * | 10/2023 | Shah | B64U 50/37 244/114 R |
| 11,776,136 | B1 * | 10/2023 | Pachikov | B64U 10/13 244/17.23 |
| 11,780,606 | B2 * | 10/2023 | Carthew | B64U 70/99 244/114 R |

(Continued)

*Primary Examiner* — Medhat Badawi  
(74) *Attorney, Agent, or Firm* — Inskeep IP Group, Inc.

(57) ABSTRACT

A portable launch and landing pad for a rotor drone is disclosed, comprising a circular arrangement of rigid panels, each having a generally triangular profile shape. The rigid panels are connected by hinges along their side edges, allowing articulation between adjacent panels. This design enables the launch and landing pad to be easily, compactly transported and assembled, providing a stable and secure platform for the rotor drone during takeoff and landing operations. This design may better hug or conform to undulating terrain, and does not blow away when drone thrust hits the pad. This may provide benefits of keeping a drone camera lens and gimbal clean, preventing prop strikes and lens strikes from pebbles or tall grass, and preventing dirt and debris from entering motor bearings and shortening useful life.

24 Claims, 13 Drawing Sheets

Bring wrists together

(56) References Cited

U.S. PATENT DOCUMENTS

| | | | | |
|---|---|---|---|---|
| 11,814,191 B2* | 11/2023 | Cheng | | B64U 60/50 |
| 11,814,241 B2* | 11/2023 | Tian | | B60P 3/11 |
| 11,840,152 B2* | 12/2023 | Fisher | | B64C 29/02 |
| 11,851,209 B2* | 12/2023 | Fisher | | B64F 1/005 |
| 11,866,168 B2* | 1/2024 | Cooper | | B64U 70/97 |
| 12,059,089 B1* | 8/2024 | Dunn | | A47G 29/141 |
| 12,099,370 B2* | 9/2024 | Jourdan | | G05D 1/0676 |
| 12,134,329 B2* | 11/2024 | Todeschini | | G05D 1/0088 |
| 12,172,777 B2* | 12/2024 | Carthew | | B64U 70/93 |
| 12,202,634 B1* | 1/2025 | England | | B64U 20/87 |
| 12,214,902 B2* | 2/2025 | Infanti | | B64C 25/62 |
| 12,246,865 B2* | 3/2025 | Kiyokami | | B64C 39/024 |
| 2010/0038480 A1* | 2/2010 | Wu | | B64F 1/26 244/114 B |
| 2011/0068224 A1* | 3/2011 | Kang | | B64U 80/25 244/116 |
| 2011/0174925 A1* | 7/2011 | Ying | | B64F 1/005 701/16 |
| 2014/0124621 A1* | 5/2014 | Godzdanker | | B64F 1/28 244/110 E |
| 2015/0069968 A1* | 3/2015 | Pounds | | B60L 53/35 320/109 |
| 2015/0097530 A1* | 4/2015 | Scarlatti | | H02J 7/00 320/109 |
| 2016/0257424 A1* | 9/2016 | Stabler | | A63H 27/12 |
| 2017/0129603 A1* | 5/2017 | Raptopoulos | | B64F 1/22 |
| 2017/0283090 A1* | 10/2017 | Miller | | B64U 70/97 |
| 2018/0039286 A1* | 2/2018 | Tirpak | | B64U 80/25 |
| 2018/0053139 A1* | 2/2018 | Stoman | | B64U 10/13 |
| 2018/0056794 A1* | 3/2018 | Kim | | B60L 53/126 |
| 2018/0105271 A1* | 4/2018 | Wypyszynski | | B64U 10/13 |
| 2018/0237161 A1* | 8/2018 | Minnick | | B64U 50/37 |
| 2018/0265196 A1* | 9/2018 | Phillips | | B64F 1/20 |
| 2018/0370652 A1* | 12/2018 | Vendrame | | B64F 1/04 |
| 2019/0002128 A1* | 1/2019 | Raz | | B64U 70/99 |
| 2019/0023133 A1* | 1/2019 | Renold | | B60L 53/35 |
| 2019/0217968 A1* | 7/2019 | Schmidt | | B64F 1/00 |
| 2019/0270526 A1* | 9/2019 | Hehn | | B64U 80/70 |
| 2019/0315463 A1* | 10/2019 | Chen | | F24H 15/25 |
| 2020/0010214 A1* | 1/2020 | Newcomb | | B64F 1/362 |
| 2020/0113167 A1* | 4/2020 | Bouten | | A01C 23/008 |
| 2020/0207484 A1* | 7/2020 | Foggia | | B64U 70/92 |
| 2021/0016696 A1* | 1/2021 | Kelly | | F16B 2/22 |
| 2021/0053677 A1* | 2/2021 | Passley | | B64U 70/95 |
| 2021/0127658 A1* | 5/2021 | Luebke | | F16C 11/04 |
| 2021/0229805 A1* | 7/2021 | Getman | | A61H 23/0218 |
| 2021/0339842 A1* | 11/2021 | Sauer | | B64C 25/06 |
| 2021/0349456 A1* | 11/2021 | Pham | | G05D 1/0676 |
| 2022/0315248 A1* | 10/2022 | Castellano Aldave | | B64U 80/25 |
| 2023/0202682 A1* | 6/2023 | Kiyokami | | B64U 70/90 244/114 R |
| 2023/0202691 A1* | 6/2023 | Kiyokami | | B64U 80/86 244/114 R |
| 2023/0373626 A1* | 11/2023 | Kiyokami | | B64D 1/22 |
| 2023/0399132 A1* | 12/2023 | Kiyokami | | B64C 39/024 |
| 2024/0010368 A1* | 1/2024 | Liao | | B64U 80/10 |
| 2024/0132238 A1* | 4/2024 | Qiu | | B64U 70/92 |
| 2024/0158112 A1* | 5/2024 | Le Lann | | H01M 50/262 |
| 2025/0026509 A1* | 1/2025 | Infanti | | B64U 70/50 |

* cited by examiner

Hold Landing Pad vertical in front of you

Alow top half of pad to fold down over the bottom half and hold as pictured

Bring wrists together

Place black rubber band over point of folded pad to hold in collapsed position

12/13

FOLDABLE LAUNCH AND LANDING PAD FOR DRONES

BACKGROUND

Flying drones or unmanned aerial vehicles (UAV) have become popular in recent years for their many different uses, ease of deployment, and relatively inexpensive cost as compared with manned aerial vehicles. These drones are typically either fixed-wing drones similar to planes or rotor drones similar to helicopters. While fixed-wing drones often have a propeller or rotor too, these features are typically used to move the fixed-wing drone forward such that its wings create lift. In contrast, rotor drones typically have rotors or propellers that direct air downwards in directions to create lift.

Rotor drones have become particularly popular for use in photography and videography. Most rotor drones are relatively small and therefore may be transported and used in a variety of different geographic locations. Additionally, rotor drones typically allow users to attach a variety of different camera types, ranging from small inexpensive cameras to more expensive cameras, such as DSLR cameras or cinematography cameras.

However, rotor drones may often exhibit some disadvantages, particularly for photography and cinematography. For example, the downwardly directed thrust of a rotor drone may kick up dirt, stones, or similar debris during takeoff and landing. This dust may cover a lens, degrading the picture or video quality. Additionally, stones or other larger objects may strike a camera lens, causing chips or cracks, and sand or fine dirt may cause a camera gimbal to jam.

The rotor drone itself may also be subject to similar damage. For example, dust may enter interfaces between moving parts, such as in motor bearing, increasing wear and reducing the lifespan of these components. In another example, stones, sticks, tall grass, or similar debris may cause chips in the body or propellers of the rotor drone, causing further exterior wear and damage.

For the reasons above, many rotor drone pilots will use a take off and landing pad for takeoff and landing their rotor drone. These pads may limit the dust, stones, and other debris that can cause damage to a rotor drone and any attached equipment, such as a camera.

However, lightweight and portable pads often require stakes or similar anchors to prevent the pad from moving, folding, flipping, or otherwise achieving a configuration that is undesirable. Cement, rocky soil, or similar hard ground can make the use of stakes difficult. Additionally, a landing site may not always be the same as a takeoff site and therefore removing and replacing stakes may add undesirable difficulty.

Hence, additional improvements to portable takeoff and landing pads for rotor drones may be desirable.

SUMMARY

In some aspects, the techniques described herein relate to a portable launch and landing pad for a rotor drone, including: a plurality of rigid panels that each include a generally triangular profile shape or a geometric sector profile shape; wherein each of the plurality of rigid panels are arranged such that one corner of each of the generally triangular profile shapes or geometric sector profile shapes are located at a center region of the portable launch and landing pad; a plurality of hinges connecting side edges of each of the plurality of rigid panels to adjacent panels of the plurality of side edges such that each of the plurality of rigid panels may articulate relative to the adjacent panels.

In some aspects, the techniques described herein relate to a portable launch and landing pad, wherein the plurality of rigid panels are arranged in a circular shape.

In some aspects, the techniques described herein relate to a portable launch and landing pad, wherein the plurality of hinges are each living hinges forming diameters passing through the center of the portable launch and landing pad such that when drone thrust hits the portable launch and landing pad from any surrounding direction, about 50% of a total weight of the portable launch and landing pad limits a single rigid panel of the plurality of rigid panels from lifting up.

In some aspects, the techniques described herein relate to a portable launch and landing pad, wherein the plurality rigid panels each have a planer top surface and/or a planar thickness.

In some aspects, the techniques described herein relate to a portable launch and landing pad, wherein a top profile of each of the plurality rigid panels have two relatively straight side edges and a curved outer edge.

In some aspects, the techniques described herein relate to a portable launch and landing pad, further including a first flexible layer including a circular shape and wherein the plurality of rigid panels are connected to the first flexible layer.

In some aspects, the techniques described herein relate to a portable launch and landing pad, further including a second flexible layer including a circular shape and wherein the plurality of rigid panels are connected to the second flexible layer.

In some aspects, the techniques described herein relate to a portable launch and landing pad, wherein the first flexible layer and the second flexible layer are connected to each other via adhesive, heat sealing, or sewing.

In some aspects, the techniques described herein relate to a portable launch and landing pad, wherein the first flexible layer and the second flexible layer are connected to each other around a perimeter of each of the plurality of rigid panels.

In some aspects, the techniques described herein relate to a portable launch and landing pad, wherein the plurality of rigid panels have a non-uniform thickness.

In some aspects, the techniques described herein relate to a portable launch and landing pad, further including a weight feature located near a perimeter of the portable launch and landing pad.

In some aspects, the techniques described herein relate to a portable launch and landing pad, wherein the plurality of rigid panels is an even number of rigid panels; and wherein a plurality of living hinges form diameters across a center of the portable launch and landing pad so as to encase the plurality of rigid panels.

In some aspects, the techniques described herein relate to a portable launch and landing pad, wherein the plurality of rigid panels is an odd number of rigid panels; and wherein a plurality of living hinges form radii from a center of the portable launch and landing pad so as to encase the plurality of rigid panels.

In some aspects, the techniques described herein relate to a portable launch and landing pad, wherein the plurality of hinges further include one or more breakaway hinges that selectively detach from an adjacent rigid panel of the plurality of panels.

In some aspects, the techniques described herein relate to a portable launch and landing pad for a rotor drone, including: a first layer of flexible material having a generally circular shape; a second layer of flexible material having a generally circular shape; a plurality rigid panels that each include a generally triangular profile shape or geometric sector profile shape of equal sizes; wherein the plurality of rigid panels is arranged in a generally circular shape and fixed between the first layer of flexible material and the second layer of flexible material; where each of the plurality of rigid panels may articulate relative to adjacent panels of the plurality of rigid panels.

In some aspects, the techniques described herein relate to a portable launch and landing pad, wherein the first layer of flexible material and the second layer of flexible material form a plurality of living hinges connecting adjacent panels of the plurality of rigid panels together, and wherein the plurality of living hinges form diameters passing through a center of the circular shape such that when drone thrust hits the portable launch and landing pad from any surrounding direction above, about 50% of a total weight of the portable launch and landing pad limits a single rigid panel of the plurality of rigid panels from lifting up.

In some aspects, the techniques described herein relate to a portable launch and landing pad, wherein the plurality rigid panels each have a planer top surface and/or a planar thickness.

In some aspects, the techniques described herein relate to a portable launch and landing pad, wherein a top profile of each of the plurality rigid panels have two relatively straight side edges and a curved outer edge.

In some aspects, the techniques described herein relate to a portable launch and landing pad, wherein the first flexible layer and the second flexible layer are connected to each other via adhesive, heat sealing, or sewing.

In some aspects, the techniques described herein relate to a portable launch and landing pad, wherein the first flexible layer and the second flexible layer are connected to each other around a perimeter of each of the plurality of rigid panels.

In some aspects, the techniques described herein relate to a portable launch and landing pad, wherein the plurality of rigid panels have a non-uniform thickness.

In some aspects, the techniques described herein relate to a portable launch and landing pad, further including a weight feature located near a perimeter of the portable launch and landing pad.

In some aspects, the techniques described herein relate to a portable launch and landing pad for a rotor drone, including: a plurality of rigid panels having outer edges that are curved, straight, or multiple straight sections; and, a plurality of living hinges intersecting at a center area of a square or polygon shape, and connecting side edges of each of the plurality of rigid panels to adjacent panels of the plurality of rigid panels such that each of the plurality of rigid panels may articulate relative to the adjacent panels.

In some aspects, the techniques described herein relate to a portable launch and landing pad, wherein the plurality of living hinges each have different radii or lengths to facilitate a footprint of the square or polygon shape.

BRIEF DESCRIPTION OF THE DRAWINGS

The following figures are included to illustrate certain example aspects of the present disclosure and should not be viewed as exclusive or limiting. The subject matter disclosed is capable of considerable modifications, alterations, combinations, and equivalents in form and function, as will occur to one having ordinary skill in the art and having the benefit of this disclosure. The present disclosure references the drawings as follows.

DETAILED DESCRIPTION

Figure 1:
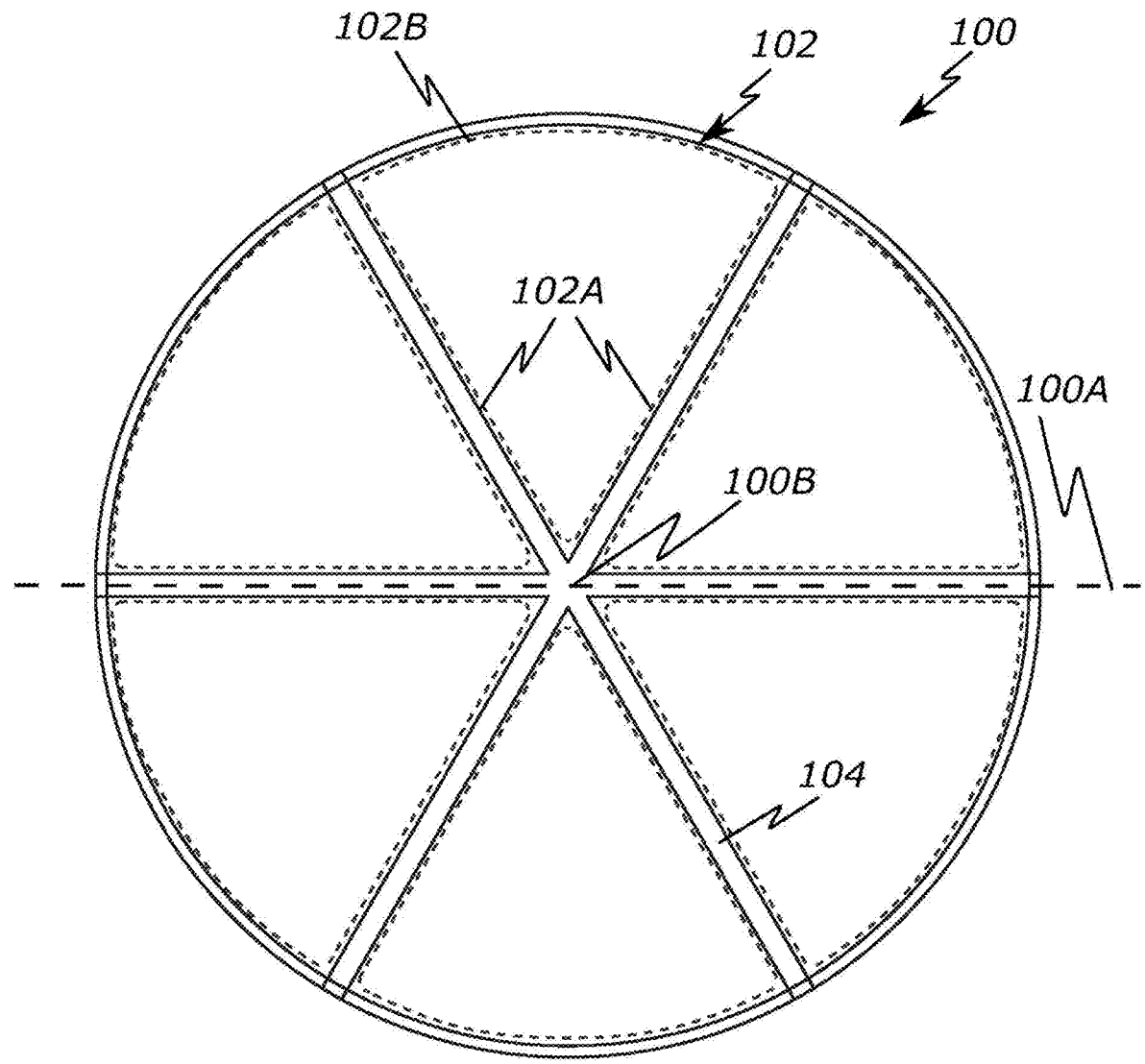
FIG. 1 illustrates a top view of a portable launch and landing pad 100 for a rotor drone (also referred to herein as a landing pad 100 for brevity) according to one example.

It will be appreciated by persons skilled in the art that the present disclosure is not limited to what has been particularly shown and described herein. A variety of modifications and variations are possible in view of the teachings herein without departing their scope, spirit, or intent.

While different examples may be described in this specification, it is specifically contemplated that any of the features from the different examples can be used and brought together in any combination. In other words, the features of different examples can be mixed and matched with each other. Hence, while every permutation of features from different examples may not be explicitly shown or described, it is the intention of this disclosure to cover any such combinations, especially as may be appreciated by one of skill in the art.

The terminology used in this disclosure should be interpreted in a permissive manner and is not intended to be limiting. In the drawings, like numbers refer to like elements. Unless otherwise noted, all of the accompanying drawings are not to scale. Unless otherwise noted, the term "about" is defined to mean plus-or-minus 5% of a stated value.

For the purposes of this specification, the term rotor drone means an aerial vehicle that directs thrust downward to create a primary source of lift for landing or takeoff, such as via a motorized rotor or propeller. A rotor drone may or may not include one or more wings in addition to the ability to direct downward thrust to create a primary source of lift. Such rotor drones typically may direct thrust downward anywhere within a 180 degree range against a landing pad.

Portable rotor drone launch and landing pads are typically composed of relatively lightweight materials that help maintain a weight conducive to easy transport and deployment in remote locations. Some portable rotor drone launch and landing pads may be composed of materials such as fabric or similar materials. However, these launch and landing pads often include heavy weights or stakes that can be anchored into the ground in order to prevent the launch and landing pads from being blown away, moved, flipped, folded, or otherwise undesirably moved from downward air thrust from a rotor drone.

The inventor has discovered that these anchoring features have several disadvantages. For example, launch and landing pads for larger rotor drones may require a large amount of weight to anchor against a potentially significant amount of thrust from the rotor(s). Hence, such weighted launch and landing pads may be undesirably heavy for many users to transport and deploy. In another example, ground stakes, similar to those used for tents, may be relatively lighter in weight but are not able to penetrate into all ground materials, such as cement, rocks, or rocky soil. Additionally, takeoff sites are not always the same as landing sites, and therefore removing and re-inserting stakes into the ground may be undesirably time consuming.

This specification is generally directed to a portable launch and landing pad for a rotor drone that is shaped and constructed such that it is resistant to being blown away, moved, flipped, folded, or otherwise undesirably moved from downward air thrust from a rotor drone. Further, this functionality may be achieved without the need for stakes, large weights, or similar ground anchoring mechanisms. This functionality may be achieved with one or more of several beneficial design features.

For example, the portable launch and landing pad may have a generally circular shape formed from a plurality of relatively rigid panels that are attached to each other via hinges. The plurality of relatively rigid panels may have generally triangular or sector shapes arranged to form a generally circular shape such that one corner of each of the triangular shapes or geometric sector shapes point to a center of the portable launch and landing pad and are located at a center region of the portable launch and landing pad. The term generally triangular shape is intended to mean a shape having at least three sides and at least three corners where at least two of the sides are generally straight and one of the sides is straight, curved, or includes one or more points as further seen in the examples discussed below. A geometric sector shape is intended to mean a portion of a generally circle shape having two radii that are connected by the arc of the generally circle shape. However, the term arc should be considered inclusive of the other outer edge shapes described in the examples below.

The hinges connecting the plurality of rigid panels allow the panels to bend relatively to each other and therefore better conform to contours of the ground. This may provide less opportunity for downward thrust from a rotor drone to push underneath the portable launch and landing pad to cause its displacement. Additionally, as downward thrust contacts the portable launch and landing pad, the panels may bend relatively towards each other against the ground, deflecting the thrust radially away and helping to creating downward pressure against the ground.

It should be further noted that while some thrust from a rotor drone may occur at an angle nearly perpendicular to the plane of a launch and landing pad, a rotor drone may initially approach a pad in a manner creating thrust that is non-perpendicular to the plane of the pad. In those circumstances, the ability of the rigid panels to bend (e.g., such that some of the outer edges are closest to the ground) may allow any non-perpendicular thrust to be better deflected and thereby better reduce potential movement.

These hinges and panels may also allow the portable launch and landing pad to fold up to a relatively small size, such as the profile size of only one of the panels (e.g., a single triangle shape profile size). In some examples, the portable launch and landing pad may fold up to as little as 17% of its unfolded profile size.

These concepts, as well as other benefits are described in further detail below with regard to the figures.

Figure 2:
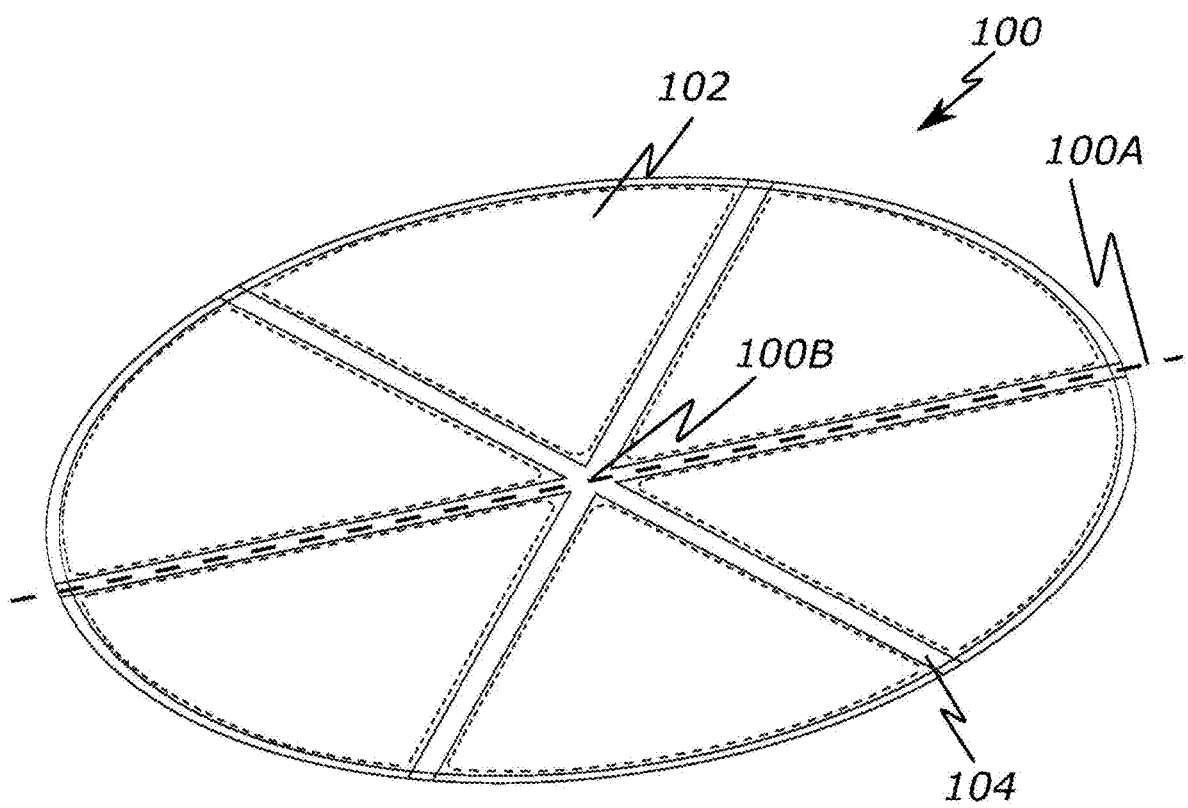
FIG. 2 illustrates a perspective view of the landing pad 100 of FIG. 1.
Figure 3:
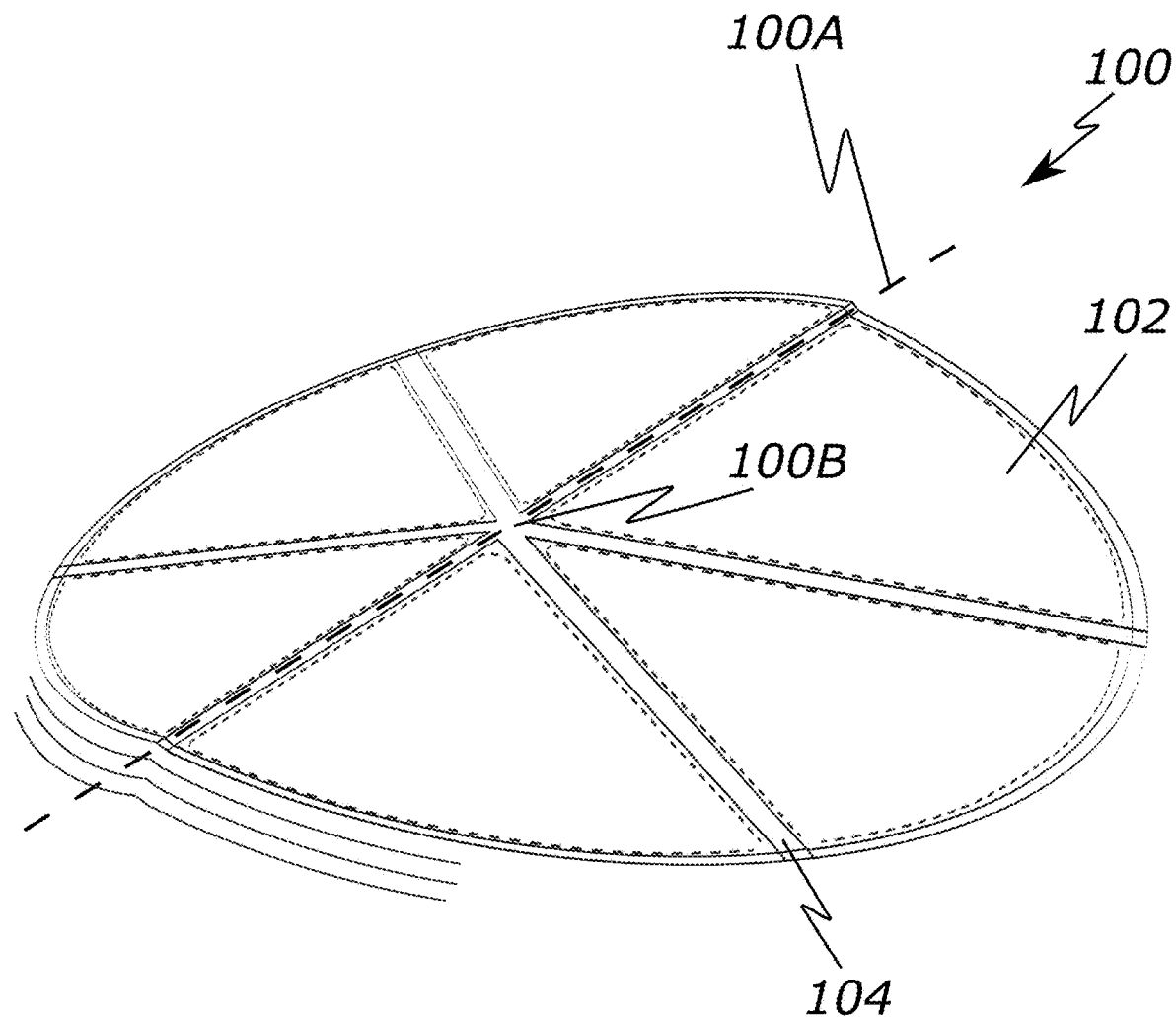
FIG. 3 illustrates a perspective view of the landing pad 100 of FIG. 1 that is partially bent along bend line 100A.

FIG. 1 illustrates a top view of a portable launch and landing pad 100 for a rotor drone (also referred to herein as a landing pad 100 for brevity). FIG. 2 illustrates a perspective view of the landing pad 100 of FIG. 1. FIG. 3 illustrates a perspective view of the landing pad 100 of FIG. 1 that is partially bent along bend line 100A. These figures will be discussed concurrently below.

In some examples, the landing pad 100 may comprise a plurality of rigid panels 102 that are each connected to adjacent panels of the plurality of rigid panels 102 via one or more hinges 104. The one or more hinges 104 may allow the plurality of rigid panels 102 to bend or create a nonplanar angle with each other in at least one direction, but preferably in two directions (e.g., such that two of the plurality of rigid panels 102 may form a peak or valley between their adjacent edges).

The plurality of rigid panels 102 may be relatively rigid such that they resist being easily bent by a user. In some examples, the plurality of rigid panels 102 may be composed of metal, plastic, fiber board, wood, or any combination of the same or similar.

The plurality of rigid panels 102 may be shaped such that, when arranged together, they form a generally planar circular shape when viewed from a top or bottom of the arrangement. In one example, the plurality of rigid panels 102 each may have a generally sector or triangular shape. In this context, generally sector or generally triangular shape may mean having at least two relatively straight side edges 102A that intersect with each other near a center 100B (e.g., a center region) of the landing pad 100. The point of intersection may be a relatively sharp point or may be rounded. The term generally sector or triangular shape further refers to the top/bottom profile shape, as seen in the top view of FIG. 1.

In some examples, the plurality of rigid panels 102 may all be of equal sizes. This may better allow the one or more hinges 104 to create or be arranged in a plurality of diameters directly across the landing pad 100.

Figure 10A:
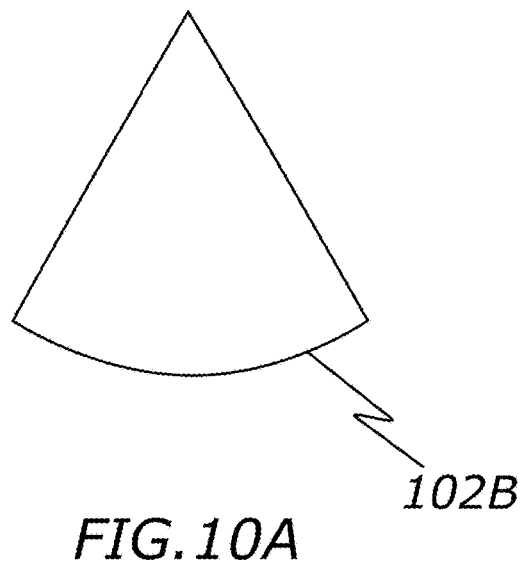
FIG. 10A illustrates a top view of a panel according to one example.

Each of the plurality of rigid panels 102 also may have an outer edge 102B. In one example, the outer edge 102B may have a curvature that arcs outward and away from the center 100B, as also seen in FIG. 10A. In some examples, this shape may be considered a "sector" shape of a circle with two radii and a part circle or arc connecting the radii. This curvature may be uniform and may be the same or similar for each of the plurality of rigid panels 102. This curvature may help the plurality of rigid panels 102 to form a generally circular shape overall when arranged adjacent to each other as seen in FIG. 1. However, as noted earlier in this specification, the term sector should not necessarily be limited to having an outer edge 102B of only an arc shape. The further examples of shapes of the outer edge 102B should also be inclusive in such a definition.

Figure 10B:
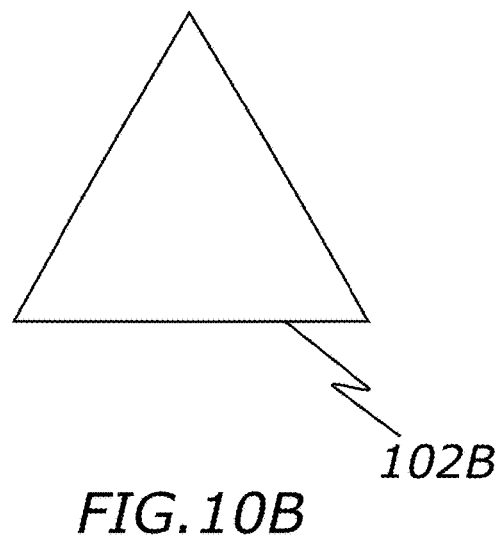
FIG. 10B illustrates a top view of a panel according to one example.

In another example, FIG. 10B illustrates a top view of a panel in which the outer edge 102B may be alternatively straight or may be composed of a plurality of straight segments that are angled relative to each other. Particularly if the landing pad 100 comprises a relatively high number of segments, such an outer edge 102B may result in an overall shape of the landing pad 100 that is generally circular. In other words, the overall shape of the landing pad 100 may have an outer perimeter that is continuously curved to form a generally circular shape or may have a perimeter with a plurality of straight segments angled such that the overall shape of the landing pad 100 closely approximates a circular shape and therefore may also be considered generally circular in shape (e.g., a hexagon shape).

Figure 10C:
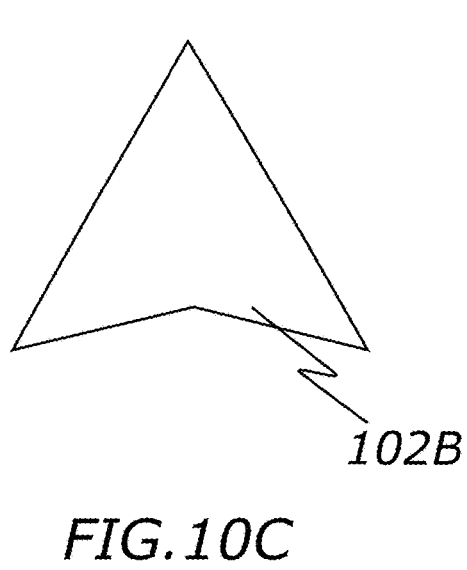
FIG. 10C illustrates a top view of a panel according to one example.

In another example, FIG. 10C illustrates a top view of a panel in which the outer edge 102B may extend inward toward the center 100B. In this example, the outer edge 102B comprises two straight segments that form an angle relative to each other. Alternatively, the outer edge 102B may form a continuously curved shape similar to FIG. 10A but in the opposite direction.

Figure 10D:
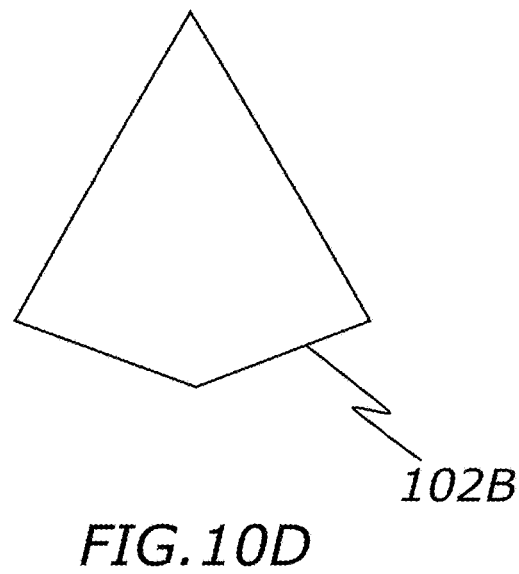
FIG. 10D illustrates a top view of a panel according to one example.

In another example, FIG. 10D illustrates a top view of a panel in which the outer edge 102B may extend outward similar to that shown in FIG. 10A, but with two relatively straight segments that form an angle relatively to each other.

The plurality of rigid panels 102 may all be generally flat or planar. In other words, at least the top surface or the entire thickness of the plurality of rigid panels 102 may be generally flat or planar. In an alternative example, the plurality of rigid panels 102 may have a slight curvature to their thickness or top surface. For example, the plurality of rigid panels 102 may have a slight curvature downward from the center 100B towards a perimeter of the landing pad 100 to help deflect thrust or may increase in thickness toward the outer perimeter to increase weight.

In some examples, the plurality of rigid panels 102 may each have a weight within an inclusive range of about 1 ounce to about 80 ounces.

The landing pad 100 may comprise an even number of the plurality of rigid panels 102. In some examples, the plurality of rigid panels 102 comprise an inclusive range of about 4 panels to 32 or more panels. Some specific examples of panel numbers include, 4, 6, 8, 10, 12, 14, 16, 18, 20, 22, 24, 26, 28, 30, 32, or more panels. The landing pad 100 may alternatively comprise an odd number of the plurality of rigid panels 102, such as 3, 5, 7, 9, 11, or more panels.

One advantage to including an even number of the plurality of rigid panels 102 is that the landing pad 100 may bend entirely across the landing pad 100, as represented in the example bend line 100A. Allowing the landing pad 100 to bend entirely across may be helpful for accommodating different ground contours. Additionally, the landing pad 100 may be more easily folded to a smaller size while all of the plurality of rigid panels 102 remain connected to adjacent panels. In other words, an odd number of the plurality of rigid panels 102 may require that at least two of the plurality of rigid panels 102 separate or break away from their hinge connection between their at least two relatively straight side edges 102A to fold up to a desirable size (e.g., to a profile size of one of the plurality of rigid panels 102). However, a detachable hinge between at least two of the plurality of rigid panels 102 where the plurality of rigid panels 102 are an odd number is also contemplated as part of the present specification.

The one or more hinges 104 that connect adjacent panels of the plurality of rigid panels 102 may allow the plurality of rigid panels 102 to bend in at least one direction relative to a planar configuration of the landing pad 100 and preferably in two directions (i.e., two panels bending upwards or downwards relative to a flat plane).

The one or more hinges 104 may take the form of a variety of different known hinge configurations. In one example, the one or more hinges 104 may be a flexural bearing such as a living hinge, as seen in FIGS. 1-3. Typically, a living hinge comprises a portion of flexible material that is attached to two components and that bends, allowing the two components to move relative to each other. In the present example of FIGS. 1-3, a single living hinge extends along the entire length of two relatively straight side edges 102A. Alternatively, a living hinge may extend only partly along the lengths of two relatively straight side edges 102A. In some examples, a plurality of living hinges may be included between two relatively straight side edges 102A. In some examples, the living hinge may be composed of a flexible polymer (e.g., vinyl), a fabric, rubber or silicone.

In other examples, the hinge may be a butt hinge, a butterfly hinge, a lift-off hinge, a continuous hinge, or other known hinge types. Hinges may be composed of materials such as metal, plastic, or similar materials.

In some examples, the hinges form diameters directly across the landing pad 100 and through a center of the landing pad 100, such as along line 100A in FIG. 1. When drone thrust hits the landing pad 100 from any surrounding direction, about 50% of a total weight of the landing pad 100 limits a single rigid panel of the plurality of rigid panels 102 to prevent it from lifting up.

Figure 4:
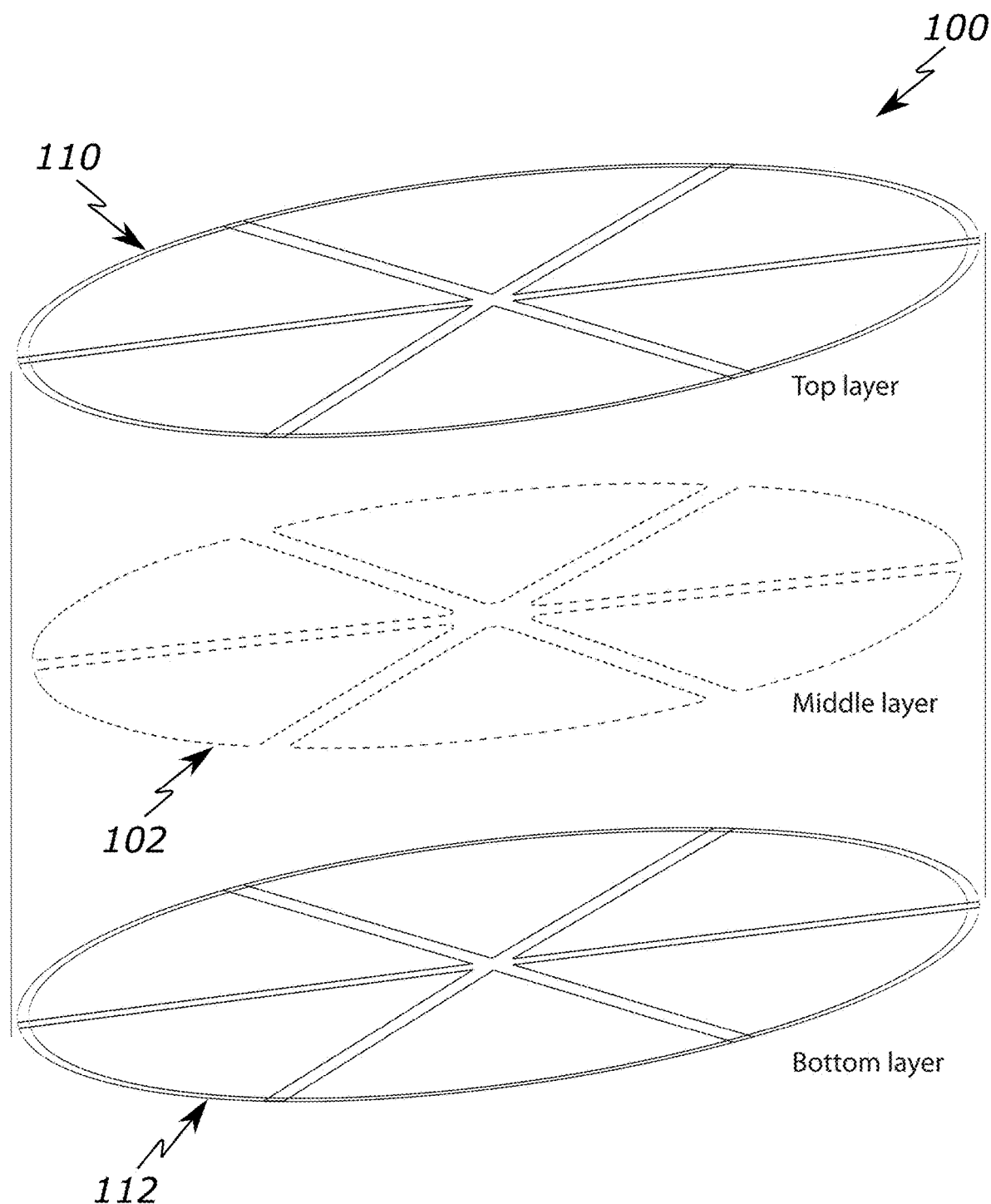
FIG. 4 illustrates an exploded view of one example construction of the landing pad 100 in which the one or more hinges 104 are living hinges according to one example.

FIG. 4 illustrates an exploded view of one example construction of the landing pad 100 in which the one or more hinges 104 are living hinges. In such an example, the landing pad 100 comprises a top layer 110 and a bottom layer 112 that may be each composed of flexible material, such as vinyl, fabric reinforced with vinyl, or similar materials, and are both circular in their profile shapes.

The plurality of rigid panels 102 may be positioned in a circular arrangement between the top layer 110 and bottom layer 112. In one example, the plurality of rigid panels 102 may be attached directly to the top layer 110, the bottom layer 112, or both layers. In another example, the top layer 110 and the bottom layer 112 may be attached to each other at areas around the plurality of rigid panels 102, forming enclosed pockets. For example, the top layer 110 and the bottom layer 112 may be attached to each other via adhesive, heat sealing/melting, sewing, rivets, or similar techniques. In some examples, these "pockets" are formed from connections between the top layer 110 and the bottom layer 112 that extend entirely around each of the plurality of rigid panels 102. Additionally, these pockets may not require that the plurality of rigid panels 102 are also directly attached to the top layer 110 or bottom layer 112 (e.g., the plurality of rigid panels 102 may "float" in these pockets). Additionally, the pockets may be relatively larger or oversized relative to the shape of the plurality of rigid panels 102, which may help the folding process of the landing pad 100. In such examples, the connections between the top layer 110 and the bottom layer 112 may be located continuously around the entire perimeter of the plurality of rigid panels 102 or only at certain locations.

In an alternative example, the landing pad 100 may include only a top layer 110 or bottom layer 112 and the plurality of rigid panels 102 are attached directly to that layer (e.g., via adhesive, rivets, sewing, or similar techniques).

In some examples, the top layer 110 and the bottom layer 112 may be attached via any of the previously described techniques along an outer perimeter of the landing pad 100 which is also adjacent to the outer edge 102B of each of the plurality of rigid panels 102. In some examples, the outer perimeter may only include this connection between layers.

In other examples a weight feature may be included. For example, a cable, cord, or other flexible, weighted member may be located along the perimeter and attached either onto or between the top layer 110 and bottom layer 112 to increase the weight near the perimeter of the landing pad 100. In some examples, the cable, cord or other flexible, weighted member may be an endless circle/hoop (i.e., no discontinuities) or may be segments forming a broken circular shape on the plurality of rigid panels 102 but not on the one or more hinges 104. In another example, each of the plurality of rigid panels 102 may additionally or alternatively have increased weight towards the outer perimeter relative to near the center 100B. For example, the plurality of rigid panels 102 may increase in thickness towards the outer edge 102B or may include a ridge or area of increase weight (e.g., a non-uniform thickness).

In some examples, the landing pad 100 may include one or more apertures to allow stakes or similar anchor mechanism to anchor the landing pad 100 to the ground. Though, as discussed elsewhere in this specification, the need for such stakes is greatly reduced or even eliminated in many circumstances.

In some examples, the landing pad 100 may include one or more mechanisms to maintain the landing pad 100 in its folded configuration. For example, an elastic band may be included, a snap may be included, hook-and-loop fasteners may be included, or other closure mechanisms may be included. In another example, a bag may be included into which the landing pad 100 may fit in its folded configuration.

In some examples, the landing pad 100 may have a circular profile diameter (e.g., diameter along bend line 100A in FIG. 1) when in its unfolded configuration within an inclusive range of about 12 inches to about 12 feet, and in a specific example of about 21 inches.

As previously discussed, the plurality of rigid panels 102 may be positioned in a circular arrangement and attached to one of the top layer 110 and bottom layer 112. In some examples, the plurality of rigid panels 102 are spaced apart from each other between the two relatively straight side edges 102A and may be within an inclusive range of about 0.1 inch to about 5 inches, and more specifically about 0.5 inch. This spacing may provide space for the one or more hinges 104 to articulate as intended, particularly if living hinges are used. Additionally, the spacing may allow the landing pad 100 to fold to its smaller, folded configuration, particularly if that folded configuration achieves a profile size of about one of the plurality of rigid panels 102.

Figure 5:
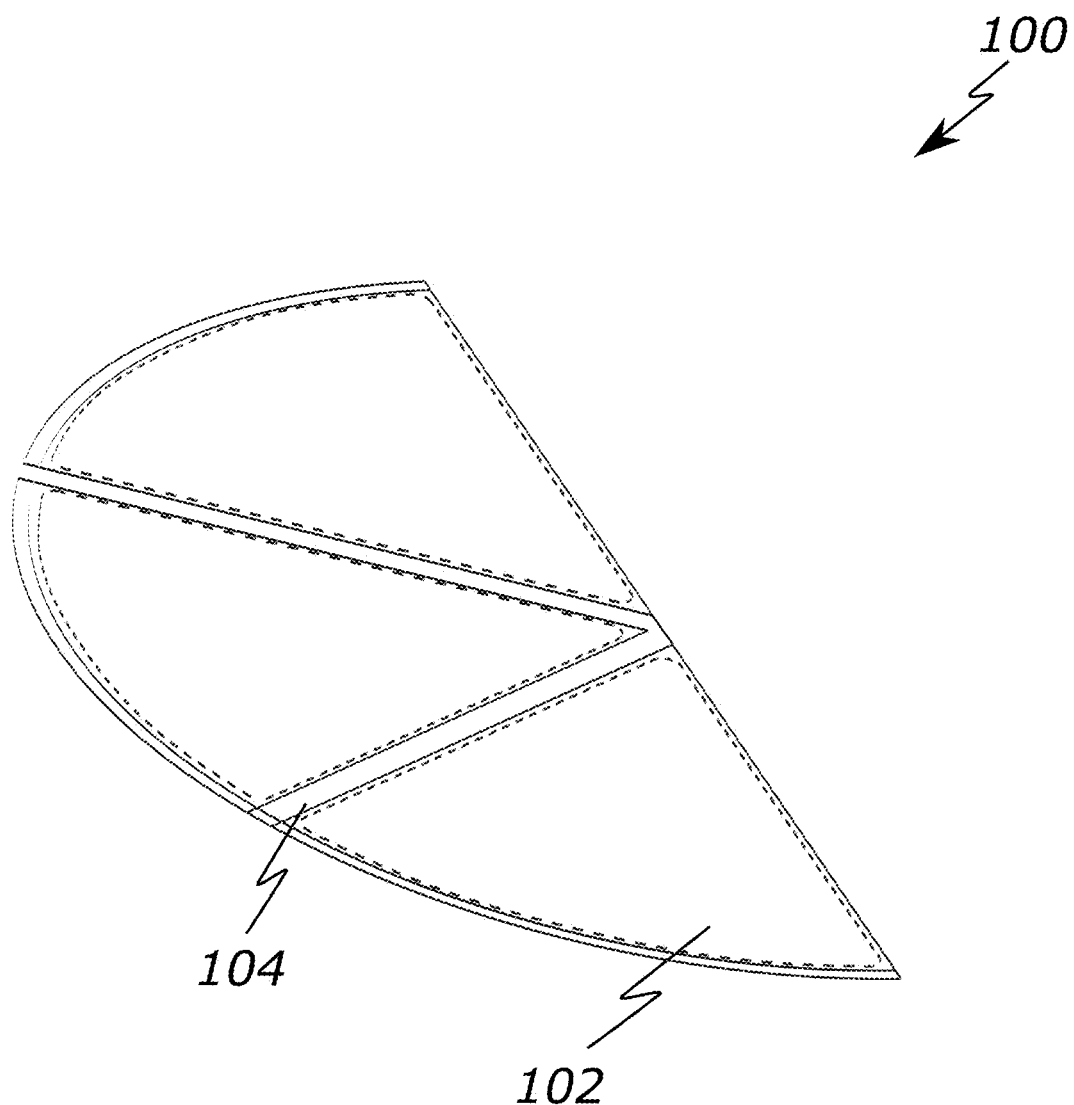
FIG. 5 illustrates the example landing pad 100 of FIG. 1 in a partially folded configuration.
Figure 6:
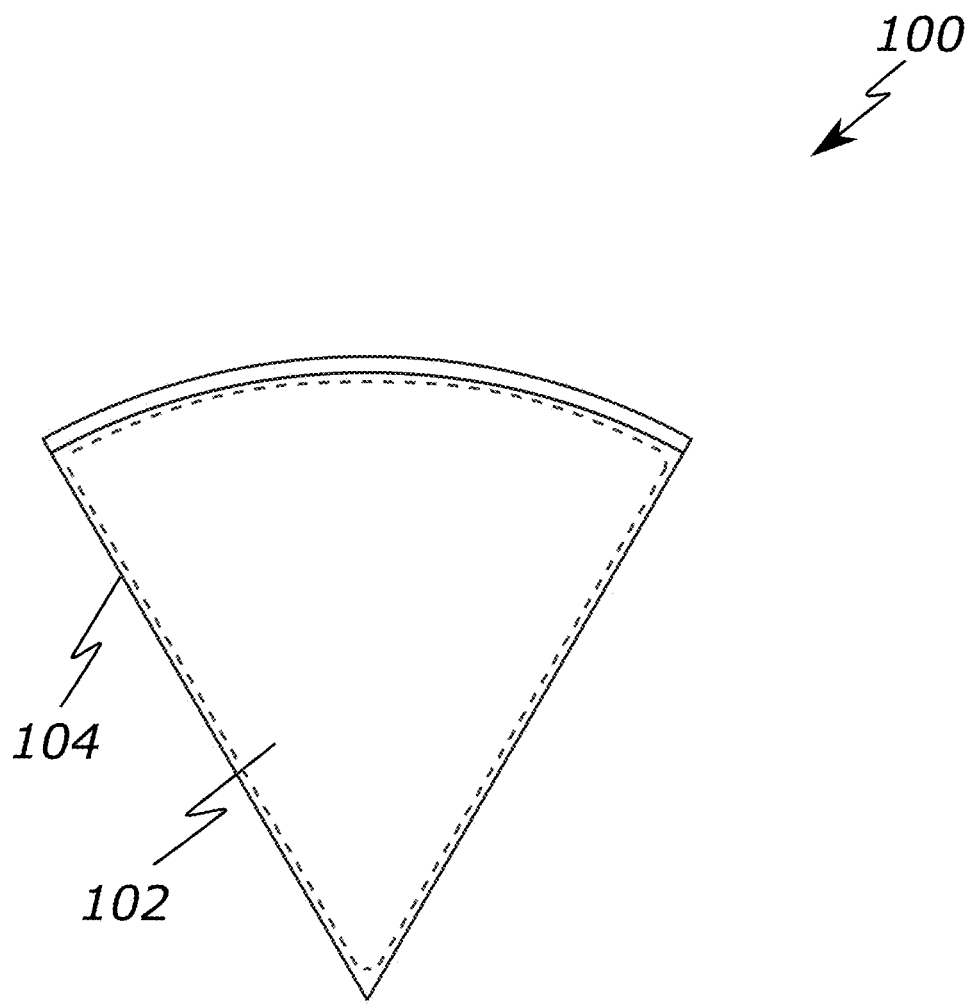
FIG. 6 illustrates the example landing pad 100 of FIG. 1 in a fully folded configuration.

FIG. 5 illustrates the example landing pad 100 of FIG. 1 in a partially folded configuration and FIG. 6 illustrates the example landing pad 100 of FIG. 1 in a fully folded configuration. Hence, the landing pad 100 may have a deployed or unfolded configuration as seen in FIG. 1 and a folded configuration as seen in FIG. 6.

Figure 7A:
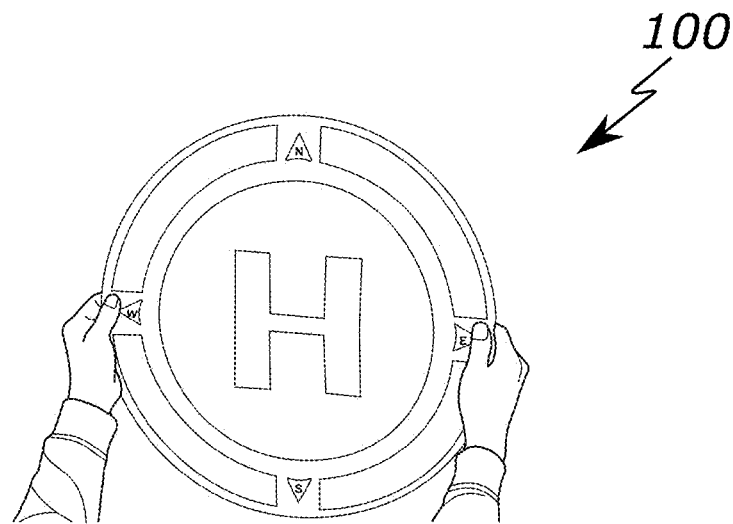
FIG. 7A illustrates a folding process of the example landing pad 100 of FIG. 1.
Figure 7B:
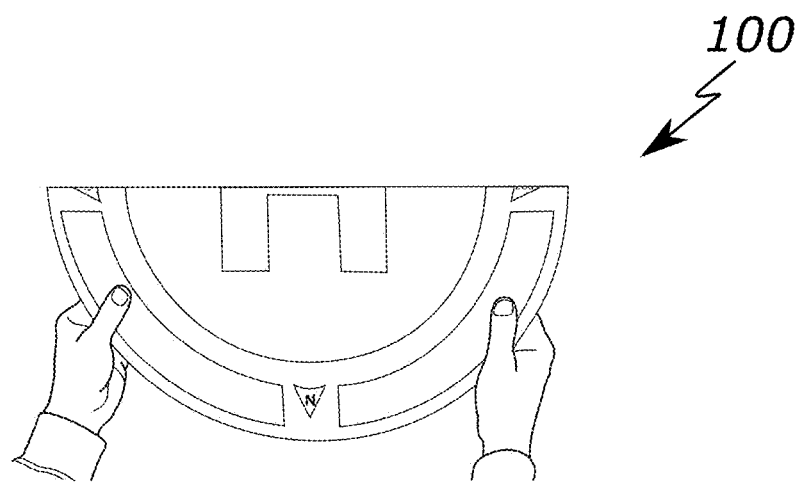
FIG. 7B illustrates a folding process of the example landing pad 100 of FIG. 1.
Figure 7C:
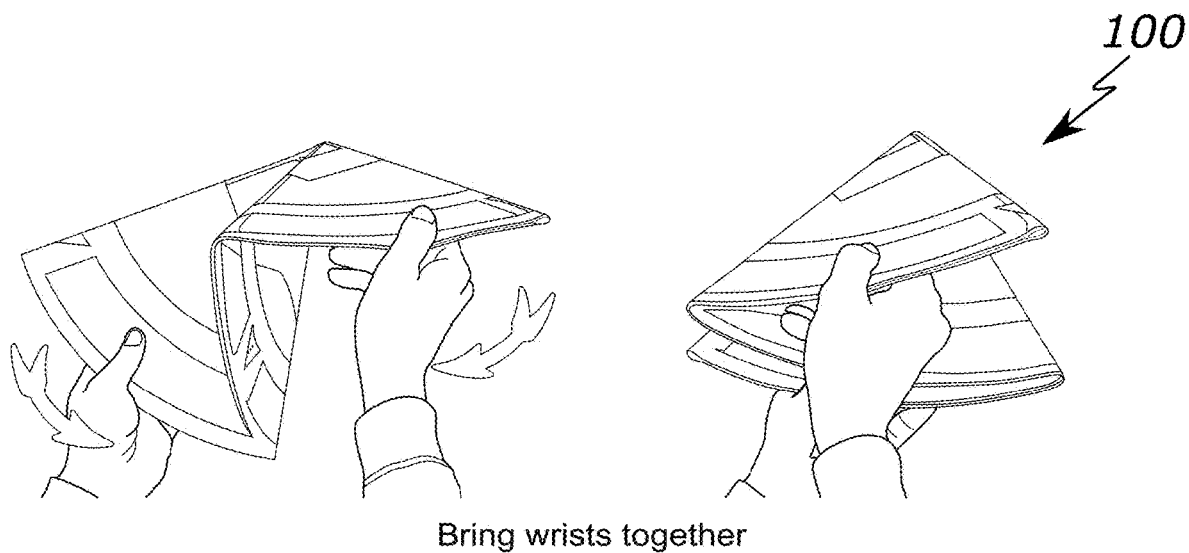
FIG. 7C illustrates a folding process of the example landing pad 100 of FIG. 1.
Figure 7D:
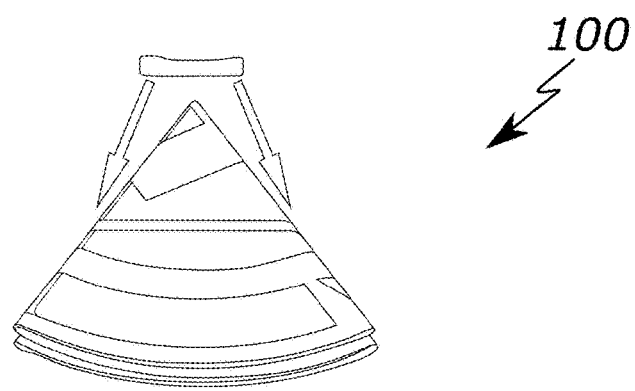
FIG. 7D illustrates a folding process of the example landing pad 100 of FIG. 1.

FIGS. 7A-7D illustrate the folding process in more detail. For example, FIG. 7A illustrates the landing pad 100 in its unfolded, expanded configuration. The landing pad 100 may be held vertically in front of the user. In FIG. 7B, a top half of the landing pad 100 is folded down over a bottom half of the landing pad 100 and held as pictured in the figure. In FIG. 7C, the user's wrists are brought together such that the half-folded landing pad 100 folds in thirds, as seen in the figure. In FIG. 7D, the landing pad 100 is in its folded configuration that is about the profile size of one of the plurality of rigid panels 102. A closure mechanism, such as an elastic band as pictured may be used to retain the landing pad 100 in the folded configuration. The reverse process/steps may also be followed to deploy the landing pad 100 to its circular unfolded configuration.

Figure 8:
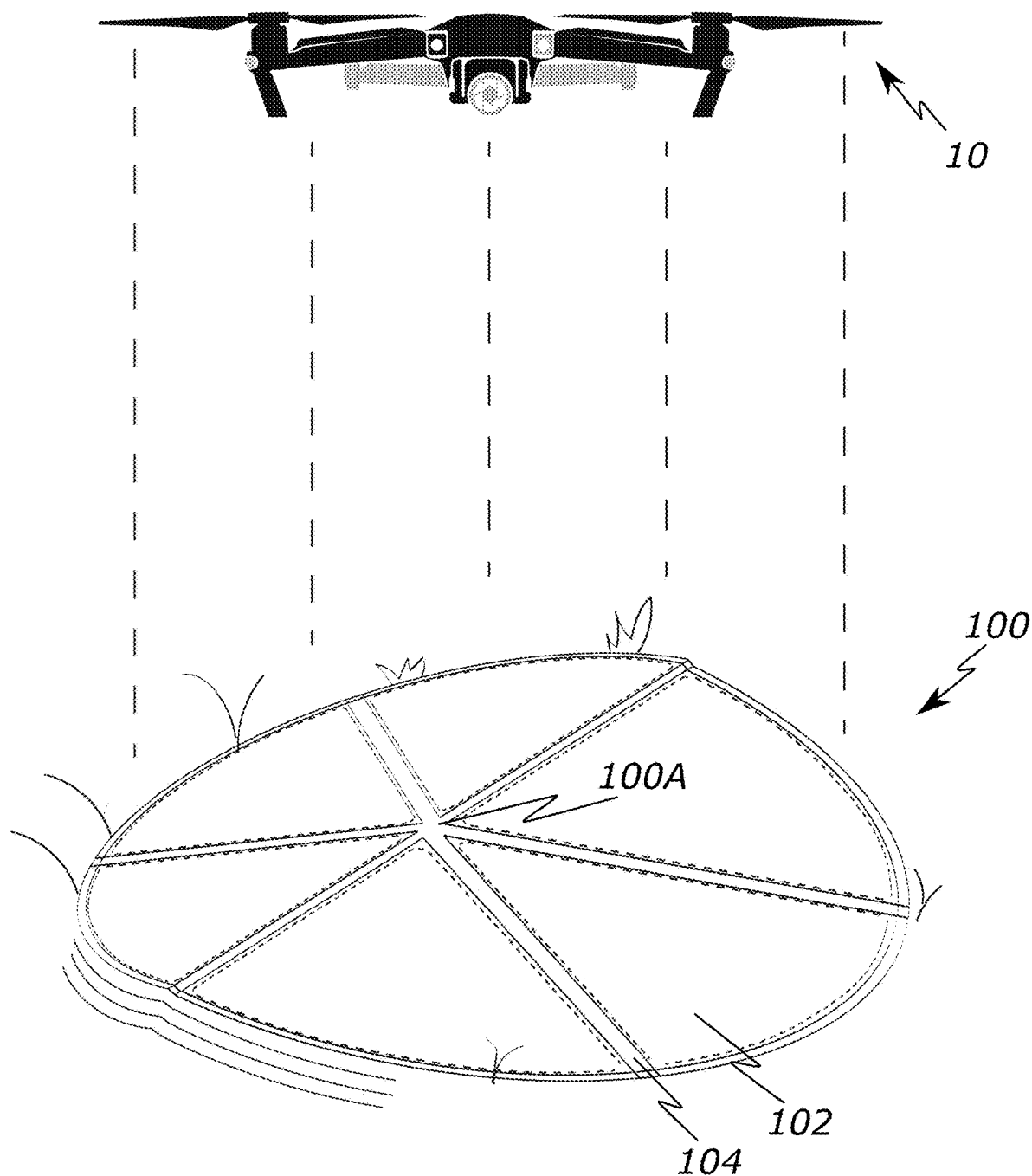
FIG. 8 illustrates a perspective view of the landing pad 100 of FIG. 1 in its unfolded configuration and conforming to an uneven ground and exposed to rotor drone thrust perpendicular to a plane of the landing pad 100.
Figure 9:
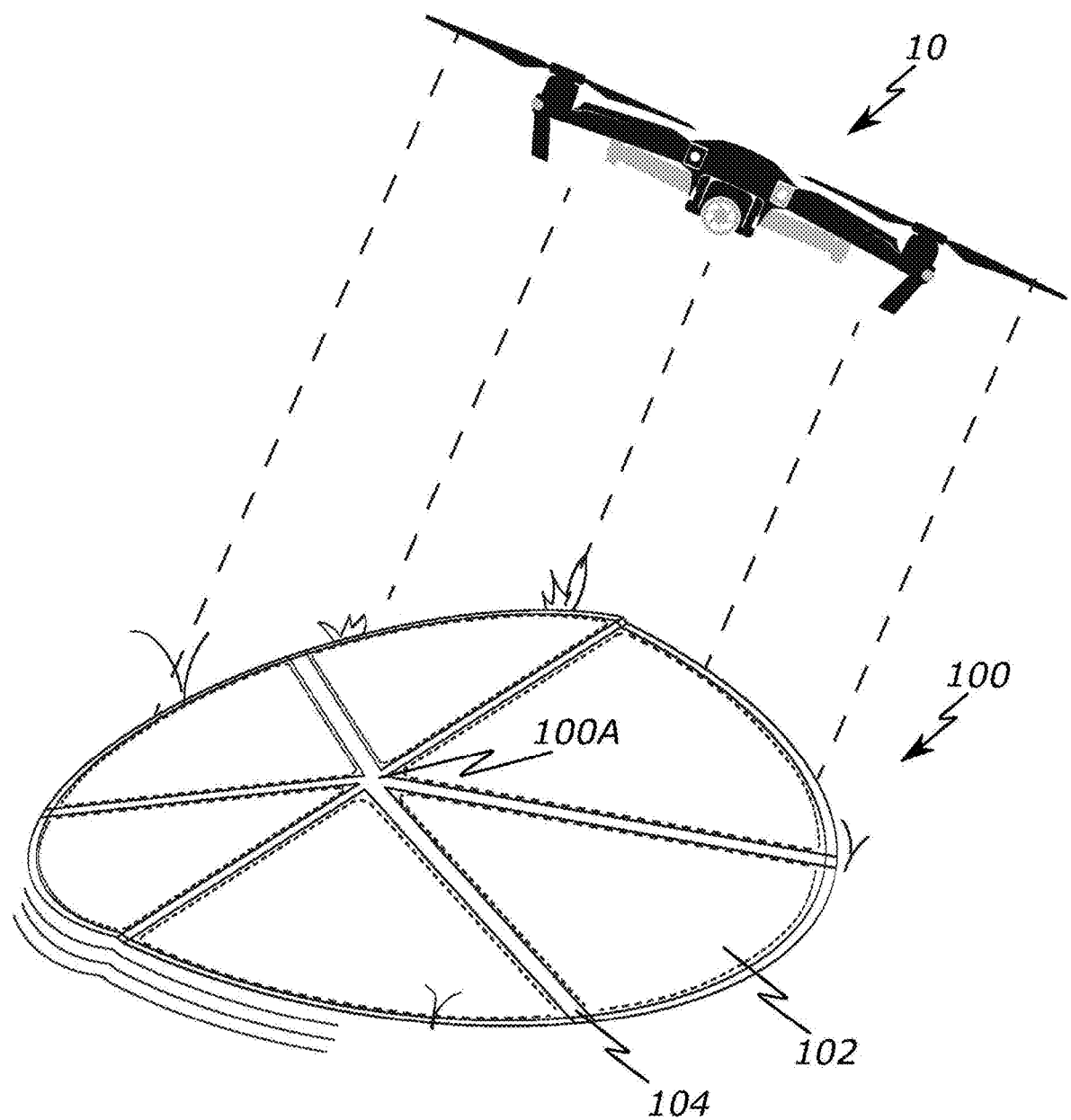
FIG. 9 illustrates a perspective view of the landing pad 100 of FIG. 1 in its unfolded configuration and conforming to an uneven ground and exposed to rotor drone thrust that is angular and non-perpendicular to a plane of the landing pad 100.

FIG. 8 and FIG. 9 illustrate perspective view of the landing pad 100 of FIG. 1 in its unfolded configuration and conforming to an uneven ground. In FIG. 8, a rotor drone 10 is positioned generally parallel to the landing pad 100 so as to generate downward thrust that is generally perpendicular to the planar face of the landing pad 100. In FIG. 9, a rotor drone 10 is positioned in generally non-parallel or at an angle to the landing pad 100 so as to generate downward thrust that is generally non-perpendicular to the planar face of the landing pad 100.

As a rotor drone 10 approaches a landing pad 100 or lifts off during a takeoff sequence, it may do so at the generally parallel orientation of FIG. 8 and/or the non-parallel orientation shown in FIG. 9, and often both orientations will occur during a landing sequence. The combination of the generally circular profile shape of the landing pad 100, the hinges 104 creating diameters across the landing pad 100, and the generally triangular shape of the plurality of rigid panels 102 may help prevent the thrust from a rotor drone 10 from moving or blowing the landing pad 100 during a landing or takeoff sequence for several reasons.

Figure 11A:
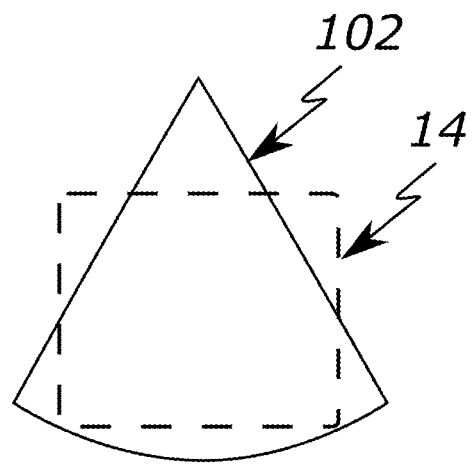
FIG. 11A illustrates a top view of a generally triangular rigid panel and a square rigid panel according to some examples.
Figure 11B:
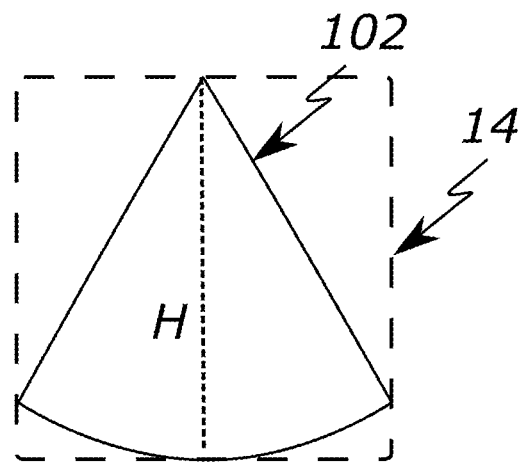
FIG. 11B illustrates a top view of a generally triangular rigid panel and a square rigid panel according to some examples.

First, the circular shape of the landing pad 100 helps maintain a desirable perimeter weight. For example, FIG. 11A illustrates a top view of a rigid panel 102 with a generally triangular shape and a rigid panel 14 (dotted line) with a square shape and that has a similar area as the rigid panel 102. In another example, FIG. 11B illustrates a similar top view of a rigid panel 102 with a generally triangular shape and a rigid panel 14 (dotted line) with a square shape that has a similar height (H). The triangular rigid panel 102 includes much more of its area and therefore weight in its outer perimeter area when compared with the square rigid panel 14. Hence, when considering panels of the same relatively area (FIG. 11A) or the same relative height (FIG. 11B) and same density of material the triangular rigid panel 102 provides a larger percentage of that weight near its radial outer area, thereby making it more difficult for air/thrust to get underneath and move the landing pad 100 upward. Square panels waste much of their weight in the center of the pad and not out at the perimeter which would provide more resistance to being lifted up by drone thrust.

Second, the circular shape may minimize the thrust leverage. A square landing pad will have a perimeter with corners that may create a relatively higher amount of leverage as compared to the circular shape of the landing pad 100 and generally triangular plurality of rigid panels 102 without such corners.

Third, the circular shape of the landing pad 100 provides a more uniform shape around the perimeter of the landing pad 100 which may make it more difficult for the thrust from a rotor drone 10 to be directed underneath. Particularly in the non-parallel orientation of the rotor drone 10 in FIG. 9, a corner of a square landing pad may be more likely to "catch" thrust and thereby direct it underneath as compared with the circular shape of the landing pad 100.

Fourth, the relatively triangular plurality of rigid panels 102 and one or more hinges 104 (e.g., living hinges) may allow the landing pad 100 to better conform to or "hug" uneven ground underneath it, even if the ground is uneven or undulating. Since each of plurality of rigid panels 102 is attached to adjacent panels via the one or more hinges 104, each panel of the plurality of rigid panels 102 may independently move or be angled/positioned relative to adjacent panels and to the center 100B. This may allow force from the thrust to be evenly applied to the surfaces of the landing pad 100 and particularly at its perimeter.

Fifth, since hinges may be formed as diameters passing through the center of the landing pad 100, when a rotor drone 10 approaches a landing pad 100 at a non-perpendicular angle relative to a plane of the landing pad 100 (e.g., FIG. 9), the thrust will initially create the most force against half of the plurality of rigid panels 102 of the landing pad 100. Hence, this design may exert about 50% of the total pad weight downwards to keep a single panel from lifting up no matter which direction a rotor drone 10 is approaching from. Again, this is due to the generally circular shape of the landing pad 100, the diameters formed from the hinges 104, and the generally triangular shape of the plurality of rigid panels 102. In contrast, when a rotor drone 10 approaches a landing pad at a non-perpendicular angle relative to a plane of the landing pad and the landing pad is square or rectangular with square/rectangular rigid panels, thrust will initially apply most of its force to less than half of the landing pad weight, depending on which side the rotor drone 10 approaches from. Hence, with a square/rectangular landing pad with square/rectangular rigid panels, not all angles of approach may engage 50% of the pad weight to keep a single panel from lifting up.

Sixth, in some instances, the generally triangular shape of the plurality of rigid panels 102 may have radiuses that intersect with the center point of the landing pad 100 which may offer much more lateral movement to conform to turf throughout the whole surface area of the pad and therefore "hug" the ground better than other shapes, such as square rigid panels of a similar number forming a right angle grid pattern of hinges. The generally triangular shape may allow each of the plurality of rigid panels 102 more of an ability to move vertically relative to adjacent rigid panels and at different angles/orientations relative to adjacent rigid panels. This ability to better conform to the ground may be important because gaps between the ground and a landing pad may create more opportunity for thrust from a rotor drone 10 to get underneath the landing pad and therefore move or flip it. Hence, the improved ground conforming performance of the generally triangular shapes of the plurality of rigid panels 102 may further improve the ability to resist movement/flipping as compared with square rigid panels.

Figure 12:
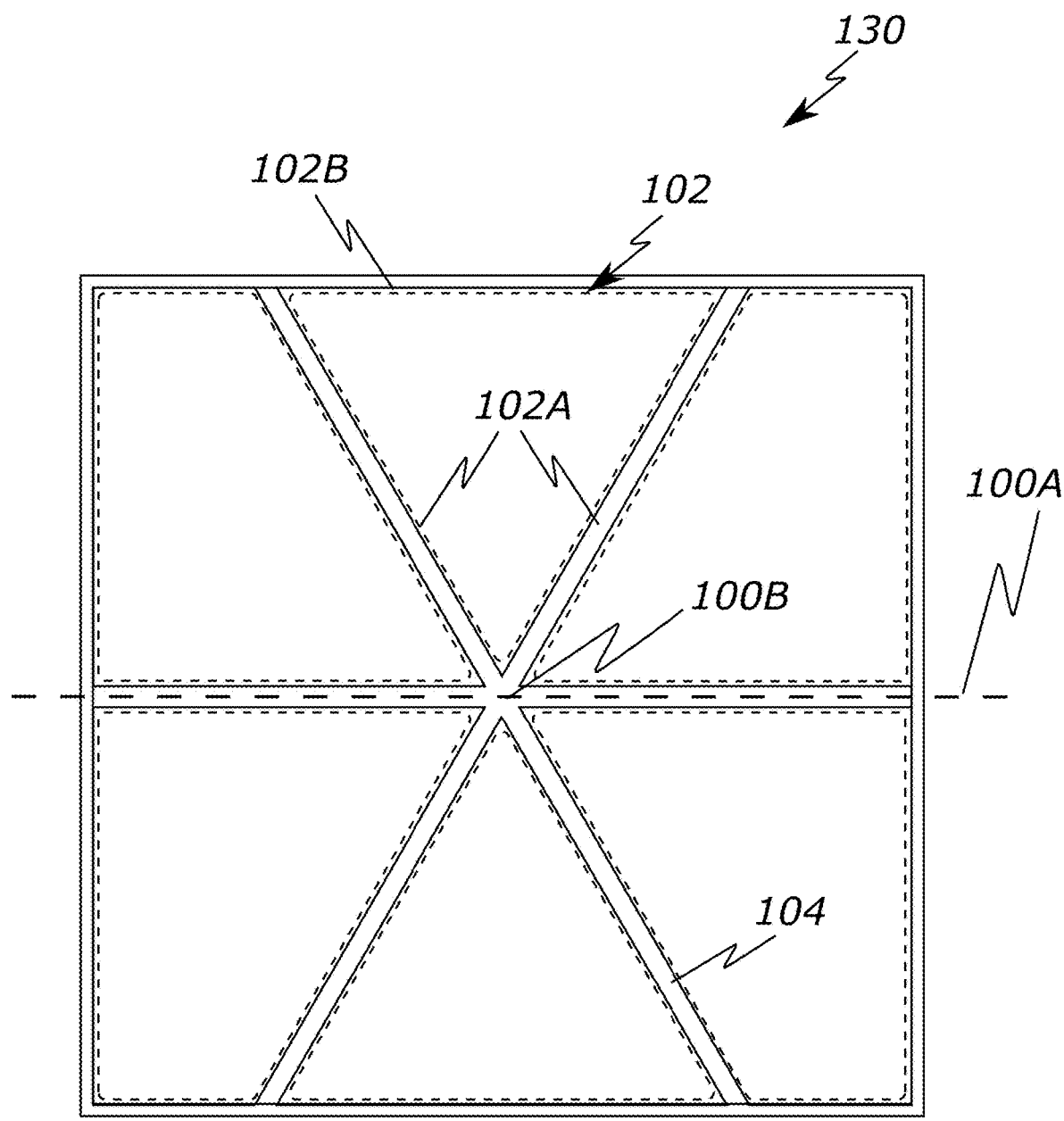
FIG. 12 illustrates a top view of a portable launch and landing pad 100 forming a square pad footprint according to one example.

While the landing pad 100 has generally been described as having a top/bottom profile or footprint that is generally circular in shape, other shapes are also possible. For example, FIG. 12 illustrates a top view of a landing pad 130 that is generally similar to landing pad 100 except that it forms a generally square or polygon profile. The plurality of rigid panels 102 all have generally triangular shapes that meet near the center 100B, however, the plurality of rigid panels 102 do not all have the same shape to accommodate the square profile shape. In this example, the outer edge 102B of two of the plurality of rigid panels 102 have relatively straight edge shapes, while four of the plurality of rigid panels 102 have offset angular shapes that form the corners. This square profile shape of the landing pad 130 may have many of the previously stated advantages of the landing pad 100, including the ability to better conform to uneven ground and maintaining relatively more weight near an outer location of each of the plurality of rigid panels 102. Similar profile shapes, such as rectangular shapes or any parallelogram shape are also possible by having different lengths or radii of the hinges 104 (e.g., living hinges).

Further, for the above reasons the use of stakes or similar anchor mechanisms may be optional or not required at all.

Additional details and background may be found in U.S. Pat. No. 11,235,891 which is incorporated herein by reference.

What is claimed is:

1. A portable launch and landing pad for a rotor drone, comprising:
   a plurality of panels that each comprise a generally triangular profile shape or a geometric sector profile shape; wherein each of the plurality of panels are arranged such that one corner of each of the generally triangular profile shapes or geometric sector profile shapes are located at a center region of the portable launch and landing pad;
   a plurality of hinges connecting side edges of each of the plurality of panels to adjacent panels of the plurality of side edges such that each of the plurality of panels articulate relative to the adjacent panels between a first nonplanar angle forming a peak and a second nonplanar angle forming a valley to thereby conform against uneven ground.

2. The portable launch and landing pad of claim 1, wherein the plurality of panels are arranged in a circular shape.

3. The portable launch and landing pad of claim 1, wherein the plurality of hinges are each living hinges forming diameters passing through the center of the portable launch and landing pad such that when drone thrust hits the portable launch and landing pad from any surrounding direction, about 50% of a total weight of the portable launch and landing pad limits a single panel of the plurality of panels from lifting up.

4. The portable launch and landing pad of claim 1, wherein the plurality panels each have a planer top surface and/or a planar thickness.

5. The portable launch and landing pad of claim 1, wherein a top profile of each of the plurality panels have two relatively straight side edges and a curved outer edge.

6. The portable launch and landing pad of claim 1, further comprising a first layer comprising a circular shape and wherein the plurality of panels are connected to the first layer.

7. The portable launch and landing pad of claim 6, further comprising a second layer comprising a circular shape and wherein the plurality of panels are connected to the second layer.

8. The portable launch and landing pad of claim 7, wherein the first layer and the second layer are connected to each other via adhesive, heat sealing, or sewing.

9. The portable launch and landing pad of claim 7, wherein the first layer and the second layer are connected to each other around a perimeter of each of the plurality of panels.

10. The portable launch and landing pad of claim 1, wherein the plurality of panels have a non-uniform thickness.

11. The portable launch and landing pad of claim 1, further comprising a weight feature located near a perimeter of the portable launch and landing pad.

12. The portable launch and landing pad of claim 1, wherein the plurality of panels is an even number of panels; and wherein a plurality of living hinges form diameters across a center of the portable launch and landing pad so as to encase the plurality of panels.

13. The portable launch and landing pad of claim 1, wherein the plurality of panels is an odd number of panels; and wherein a plurality of living hinges form radii from a center of the portable launch and landing pad so as to encase the plurality of panels.

14. The portable launch and landing pad of claim 13, wherein the plurality of hinges further comprise one or more breakaway hinges that selectively detach from an adjacent panel of the plurality of panels.

15. A portable launch and landing pad for a rotor drone, comprising:
   a first layer of material having a generally circular shape;
   a second layer of material having a generally circular shape;
   a plurality panels that each comprise a generally triangular profile shape or geometric sector profile shape of equal sizes; wherein the plurality of panels is arranged in a generally circular shape and fixed between the first layer of material and the second layer of material; where each of the plurality of panels articulate relative to adjacent panels of the plurality of panels.

16. The portable launch and landing pad of claim 15, wherein the first layer of material and the second layer of material form a plurality of living hinges connecting adjacent panels of the plurality of panels together, and wherein the plurality of living hinges form diameters passing through a center of the circular shape such that when drone thrust hits the portable launch and landing pad from any surrounding direction above, about 50% of a total weight of the portable launch and landing pad limits a single panel of the plurality of panels from lifting up.

17. The portable launch and landing pad of claim 15, wherein the plurality panels each have a planer top surface and/or a planar thickness.

18. The portable launch and landing pad of claim 15, wherein a top profile of each of the plurality panels have two relatively straight side edges and a curved outer edge.

19. The portable launch and landing pad of claim 15, wherein the first layer and the second layer are connected to each other via adhesive, heat sealing, or sewing.

20. The portable launch and landing pad of claim 15, wherein the first layer and the second layer are connected to each other around a perimeter of each of the plurality of panels.

21. The portable launch and landing pad of claim 15, wherein the plurality of panels have a non-uniform thickness.

22. The portable launch and landing pad of claim 15, further comprising a weight feature located near a perimeter of the portable launch and landing pad.

23. A portable launch and landing pad for a rotor drone, comprising:
   a plurality of panels having outer edges that are curved, straight, or multiple straight sections; and,
   a plurality of living hinges intersecting at a center area of a square or polygon shape, and connecting side edges of each of the plurality of panels to adjacent panels of the plurality of panels such that each of the plurality of panels articulate relative to the adjacent panels between a first nonplanar angle forming a peak and a second nonplanar angle forming a valley to thereby conform against uneven ground.

24. The portable launch and landing pad of claim 23, wherein the plurality of living hinges each have different radii or lengths to facilitate a footprint of the square or polygon shape.

* * * * *